2 Sheets—Sheet 1.
N. F. BRYANT.
Changeable-Gage Truck.
No. 1,611.
Reissued Feb. 2, 1864.
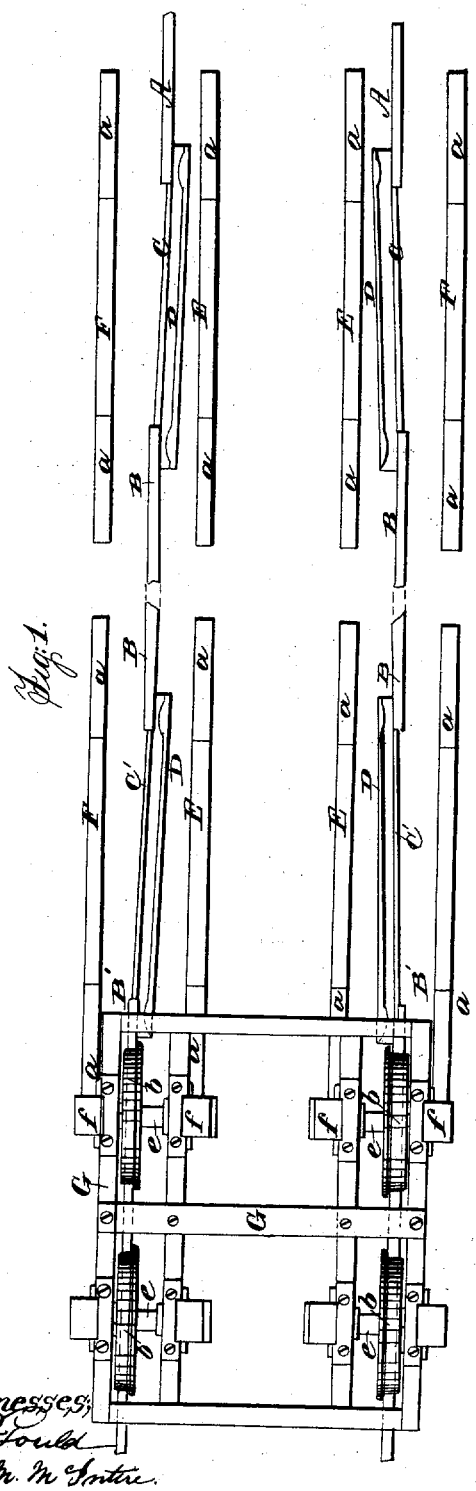
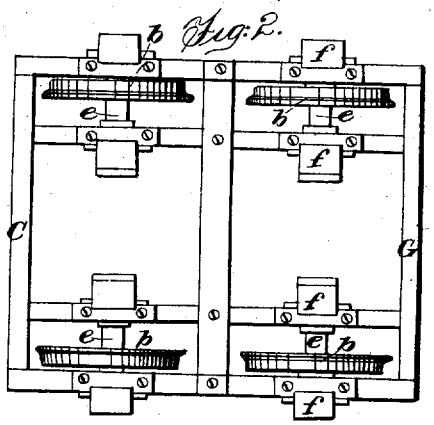
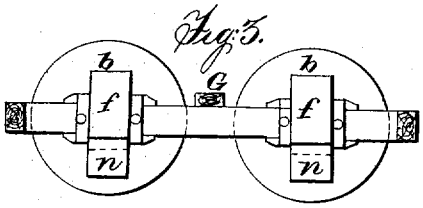
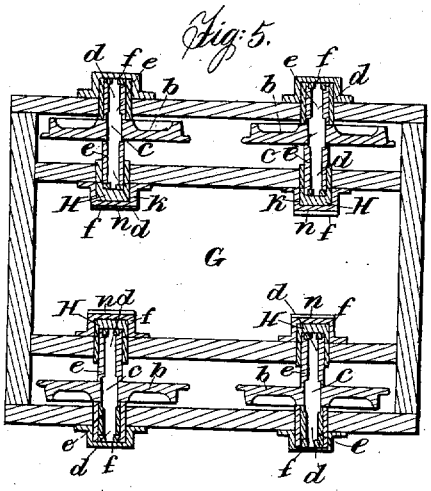
Witnesses;
H. Gould
S. M. McIntire
Inventor;
N. F. Bryant
By his atty.
H. B. Crosby
N. PETERS, PHOTO-LITHOGRAPHER, WASHINGTON, D. C.

N. F. BRYANT.
2 Sheets---Sheet 2.
Changeable-Gage Truck.
No. 1,611.
Reissued Feb. 2, 1864.
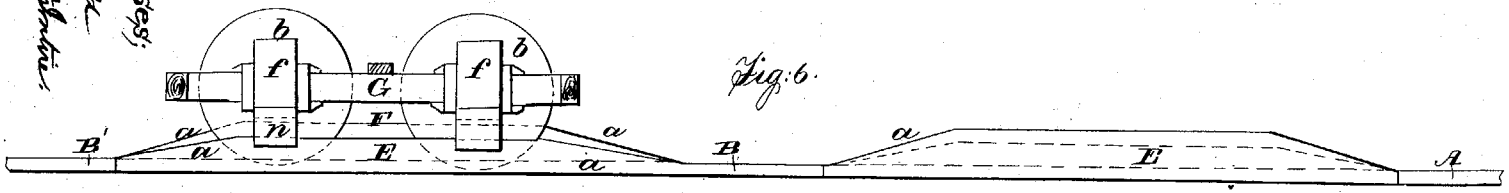
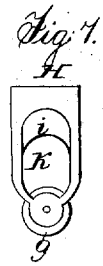
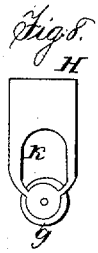
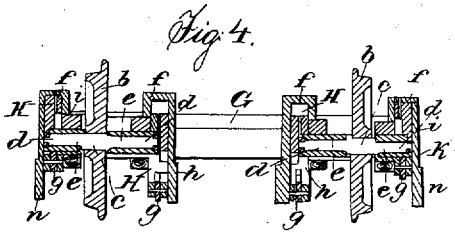
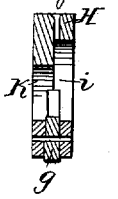
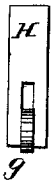
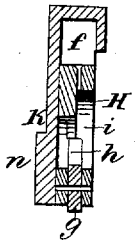
Witnesses;
T. Gould
S. M. McIntire.
Inventor;
N. F. Bryant
By his atty.
W. B. Crosby
W. PETERS, PHOTO-LITHOGRAPHER, WASHINGTON, D. C.

UNITED STATES PATENT OFFICE.

NAHUM FRANKLIN BRYANT, OF EAST BOSTON, MASSACHUSETTS.

IMPROVEMENT IN RAILWAY-CARRIAGES.

Specification forming part of Letters Patent No. 39,545, dated August 18, 1863; Reissue No. 1,611, dated February 2, 1864.

*To all whom it may concern:*

Be it known that I, NAHUM FRANKLIN BRYANT, of East Boston, in the county of Suffolk and State of Massachusetts, have invented certain new and useful Improvements in the Adaptation of Railway-Car Trucks to Tracks of Different Gages; and I do hereby declare that the following specification, taken in connection with the accompanying drawings, is a description of my invention sufficient to enable those skilled in the art to practice it.

The invention consists in the application of short axles journaled at each end to the wheels and truck of a railway-car in such manner as to allow of axial movement of the opposite axles with their wheels, so that the distance of the wheels apart can be varied to adjust the car to tracks of wide or narrow gage, as circumstances may require, or can run from one of said tracks to the other.

The invention further consists in the arrangement of the mechanism of the car-truck in connection with certain devices applied to the tracks, by which the requisite changes of the wheels from one track to another of different gage is made automatic.

Of the drawings, Figure 1 is a top view of a railway-car truck and portions of several tracks of different gages, embodying my improvements. Fig. 2 is a top view of the truck. Fig. 3 is a vertical and longitudinal section of it. Fig. 4 is a vertical transverse section of it taken axially through two of the wheels. Fig. 5 is a horizontal section of it taken axially through the four wheels.

A A B B denote two railway-tracks of different gages, the track B B being of broader gage, or having its rails more widely separated than the track A A. The two tracks, which are supposed to be in line, are connected by two changing-rails, C C, which I term a "changing-track," each rail C leading from one of the rails A to one of the rails B, as seen in Fig. 1. Other rails, B′ B′, forming a track of still broader gage, are represented in continuation of the track B B, the rails of these two tracks being connected by divergent or changing rails C′ C′. On the inner side of each change-rail C′ C′, parallel thereto, and at a distance equal to or somewhat greater than the thickness of the flange of the wheel, is a flange guide-rail D. Between each two guide or change rails are placed two chock-rails, parallel or nearly parallel to each other and with the main-track rails A B B′. Outside of each set of guide or change rails are also placed other chock-rails, F F, as seen in Fig. 1. Each chock-rail is provided with an incline or slope, *a*, running from each end of the rail to the top surface thereof, as seen in Fig. 6. The inner chock-rails, E E, have elevations different from the outer rails, F F, the inner rails opposite one set of changing rails being higher than the outer set, while in the other set of changing-rails the outer chock-rails are highest, the same being as shown in Fig. 6 by full and dotted lines, said figure representing a longitudinal section of the tracks and railway truck or carriage. All of these tracks or rails are stationary, and they comprise all the parts of mechanism relative to the tracks for changing the car from track to track and for locking the wheels in position as they reach the main tracks.

The car truck, shown at G, has four wheels, *b b b b*, and each wheel has a separate axle, *c*, which is journaled at both ends, the wheel being confined to or upon the axle and immovable with respect thereto in the usual manner. The two journals *d d* of each axle are shown as resting, respectively, in sliding boxes or bearings *e e*, so adapted and applied to the truck-frame as to be capable of sliding to and fro therein in directions longitudinally with the axis of the journals. At each end of each axle there is a vertical housing, *f*, which is bolted or fastened to the carriage-frame, and is open at bottom, as seen in Figs. 2 and 11. Each housing contains what I term a "chock," H, at each end, (shown in Figs. 4 and 5,) and also seen in Figs. 7, 8, 9, and 10, as detached from the housing, Fig. 7 being an inner elevation of the chock; Fig. 8, an outside elevation of it; Fig. 9, a vertical section of it, and Fig. 10 an edge view of it. Each chock is so applied to its housing as to freely slide up and down, and at its lower end it carries a friction roller or wheel, *g*, which is intended to run on one of the lifter or chock rails. A small stud or projection, *h*, (seen in Fig. 11, which is a vertical section of a box, *f*, and its chock H,) extends from the inner side of the box and serves to prevent the chock from falling out of the box when said chock may have attained its lowest position therein. Each chock has two recesses, *c′ k*, for the axle-box to extend into, one of the recesses opening out of the other, and both corresponding in width, while one is longer or extends farther up into the chock than the other. They extend through the chock from side to side, as seen in the drawings. *n n* are projections from or continuations of the chock-boxes, as seen in Figs. 3, 4, and 11. Each set of chock-rollers on the same side of the wheels is so applied that they are in the same vertical plane with the chock-rails, and so that they run up the inclines *a a* and over the chock-rails as the car passes over the change-rails.

The operation of the invention is as follows: Suppose the car is upon the main track A A and running toward the main track B B. As the forward wheels reach points opposite the bottom of the inclines *a a*, the chock-rollers *g*, running against and up these inclines, lift the chocks H, which leaves each journal-box and axle free to slide toward the outer side of the housing as the opposite wheels pass over and separate, by the action of the diverging change-rails C C or their flange-rails D D, the rollers lifting the chocks high enough to permit sufficient separation of the axles for the wheels to run upon the main rails B B, and in such manner that the axle-boxes shall be prevented from further separation as the car reaches and runs over the next piece of main track B B. The same operation ensues with the rear wheels of the car and with the opposite axles and wheels of each succeeding car of the train that may be passing over the track. The car continuing toward the piece of main track B′ B′, as it approaches the change-rails C′ C′ the chock-rollers encounter the inclines *a a*, opposite thereto, and again raise the chocks in their housings, so that the axle-boxes and axles may still further separate as the wheels pass over the changing-rails C′ C′ and onto the main track B′ B′. As the car passes over the change-rails and while the wheels are moving laterally, the inner face of the projections *n n* encounter or pass in such juxtaposition with the chock-rails as to steady the car or keep it from moving laterally toward either side of the track. If the car is moving in the opposite direction to that just described, the chocks are raised in the housings *f* in precisely the same manner, when the axles will be drawn toward instead of from each other, as will be readily understood.

As I do not intend herein to claim the particulars of construction of the chock and its adjuncts, it is not necessary to further elucidate its construction and operation, which may be varied as circumstances may require, while it retains the peculiarity shown of allowing at proper times the axial movement of the journal, to which it may be applied.

I would remark that I am aware that it is not new to mount a car or car-truck upon divided or short axles, as such cars have been of frequent construction. But I believe it to be novel to so apply short axles journaled at each end in such manner as to be capable of movement toward or away from each other, so that the car-truck may run over changing or diverging or converging rails or be adjusted to tracks of broad or narrow gage. In such adaptation of cars one method has heretofore been to make the wheels movable or to slide on their axles. But such construction is objectionable, and it has been my purpose in this invention to keep the relative position and construction of the wheel and axle to each other intact, the wheel being applied immovably to the axle in the usual manner. I therefore have so constructed the car that the axles and wheels together separate. Thus, while retaining the fixed relation of the wheel to the axle, adapting the car to tracks of different gages.

I am also well aware of the invention described in Letters Patent No. 37,889, where the wheels have applied to them a locking mechanism operated by manual power, whereas in my invention the locking mechanism—namely, the chocks—is operated by the chock-rails, thus making, in connection with the change-rails, an automatic wheel or axle relieving and locking mechanism, as set forth.

I claim—

1. So constructing a car-truck with divided axles (or an axle to each wheel, such axle being supported or journaled at each end thereof) that the opposite axles are movable toward or from the longitudinal center of the car, the construction being for the purpose of adapting the car to tracks of different gages, as set forth.

2. The automatic combination, consisting not only of the chocks or their equivalents applied to the truck frame and wheels, and the chock-rails or their equivalents applied to the track, but the two tracks of different gages and their wheel-changing track, (or the same and its flange guide-rails,) the whole being arranged and so as to operate substantially as specified, and in combination therewith the projections or guides *n n*, for the purpose specified.

N. F. BRYANT.

Witnesses:
J. B. CROSBY,
F. GOULD.